US006498475B2

(12) United States Patent
Foster et al.

(10) Patent No.: US 6,498,475 B2
(45) Date of Patent: Dec. 24, 2002

(54) PERFORMANCE SENSOR RING WITH REDUCED MASS

(75) Inventors: David Alden Foster, Castalia, OH (US); Larry R Kreh, Bellevue, OH (US); Karl Edward Kalb, Attica, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/800,161

(22) Filed: Mar. 6, 2001

(65) Prior Publication Data

US 2002/0125882 A1 Sep. 12, 2002

(51) Int. Cl.$^7$ .............................................. G01P 3/488
(52) U.S. Cl. ........................ 324/173; 324/166; 384/448; 29/894
(58) Field of Search ................................ 324/173, 174, 324/207.25, 207.22; 384/448; 29/592.1, 894, 893.33

(56) References Cited

U.S. PATENT DOCUMENTS

| | | | | |
|---|---|---|---|---|
| 1,847,926 A | * | 3/1932 | Chase | 29/833.33 |
| 4,795,278 A | | 1/1989 | Hayashi | 384/448 |
| 4,797,611 A | * | 1/1989 | Schrieber | 324/207.22 |
| 4,940,937 A | | 7/1990 | Hattori et al. | 324/207.22 |
| 4,988,220 A | | 1/1991 | Christiansen et al. | 384/448 |
| 5,010,290 A | | 4/1991 | Foster | 324/173 |
| 5,018,384 A | * | 5/1991 | Hayashi et al. | 73/118.1 |
| 5,053,656 A | * | 10/1991 | Hodge | 310/42 |
| 5,080,500 A | | 1/1992 | Hilby et al. | 384/448 |
| 5,111,138 A | | 5/1992 | Kramer | 324/174 |
| 5,166,611 A | | 11/1992 | Kujawa, Jr. et al. | 324/166 |
| 5,619,130 A | * | 4/1997 | Premiski et al. | 324/173 |
| 5,696,442 A | | 12/1997 | Foster et al. | 324/173 |
| 5,739,684 A | * | 4/1998 | Burns | 324/173 |
| 6,184,678 B1 | * | 2/2001 | Kumamoto | 324/173 |
| 6,392,405 B1 | * | 5/2002 | Nishizaki et al. | 29/894 |

FOREIGN PATENT DOCUMENTS

GB          2237391 A  *  5/1991  .......... G01D/5/244

* cited by examiner

Primary Examiner—Edward Lefkowitz
Assistant Examiner—Darrell Kinder
(74) Attorney, Agent, or Firm—Scott A. McBain

(57) ABSTRACT

A sensor ring and method for forming same is provided in which the ring has a stamped configuration bent into a final configuration. The stamped configuration has a flat, annular sensor portion extending from a cylindrical hub portion and the sensor portion has a plurality of substantially identical, circumferentially spaced window openings therein. Each window opening has an inner edge adjacent to and spaced radially outward from the hub and an outer edge spaced radially inward from the outer peripheral end of the sensor portion and leading and trailing edges extending, respectively, from the ends of the inner and outer edges to form each window as a polygon, preferably a trapezoid. In the final configuration, the sensor portion has a bight segment extending radially outward from the hub and a sensor or finger segment extending from the bight segment in the direction fo the hub to form a U-shaped cross-section. The sensor segment has an undulation between the outer edge of each window and the outer peripheral end of the sensor portion. The depth of the undulation is correlated to the window configuration to produce fingers and window openings laying in a cylindrical or frusto-conical plane.

23 Claims, 4 Drawing Sheets

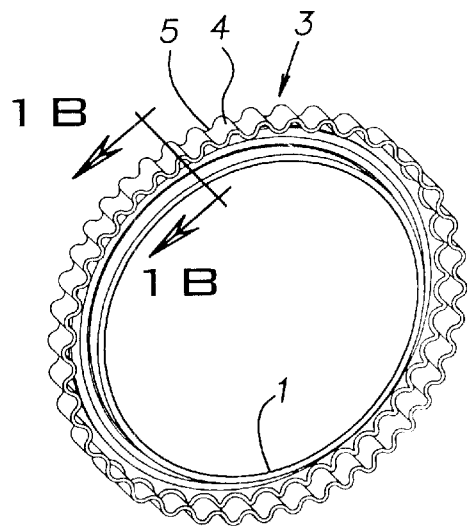
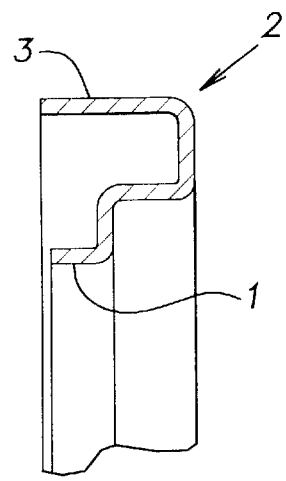
FIG. 1A
PRIOR ART
FIG. 1B
PRIOR ART
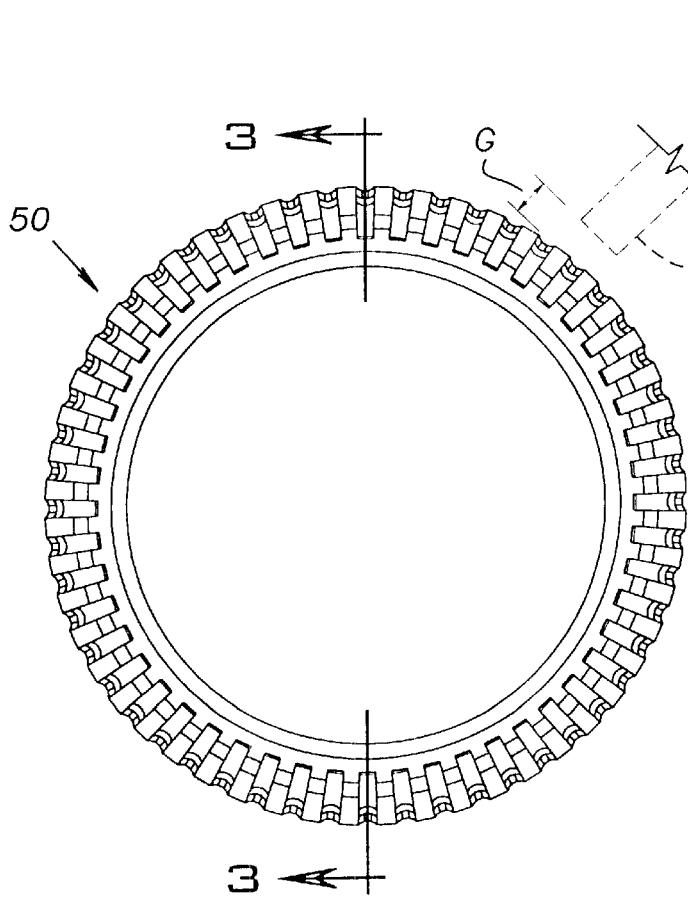
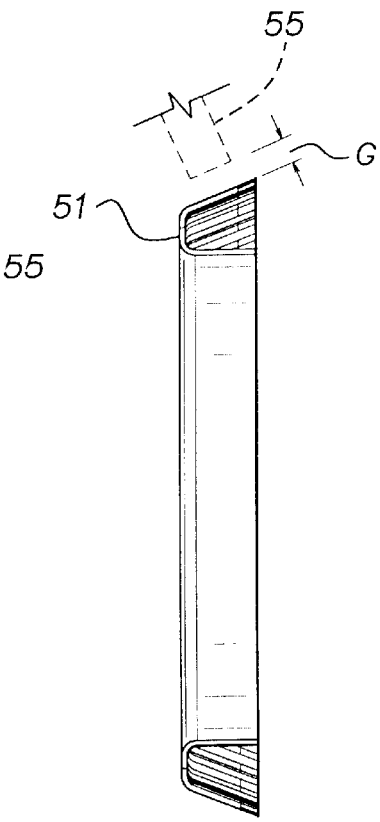
FIG. 2
FIG. 3

PERFORMANCE SENSOR RING WITH REDUCED MASS

BACKGROUND

A) Field of the Invention

This invention relates generally to a rotational velocity sensor ring and method for forming the ring.

The invention is particularly applicable to and will be described with reference to a rotational velocity sensor ring for use in a speed sensor package mounted on a wheel bearing spindle of a vehicle for anti-lock and like purposes. However, those skilled in the art will recognize that the invention has broader application and can be applied in any number of industrial and non-vehicular applications in which the rotational movement of an object is to be detected.

B) Incorporation by Reference

The following patents are incorporated by reference herein and made a part hereof so that details related to wheel bearings, wheel bearing spindles and sensors used with sensor rings which are conventionally well known in the art need not be described in detail in the specification of this patent.

1) U.S. Pat. No. 5,696,442, issued Dec. 19, 1997 to Foster, et al., entitled "ROTATIONAL VELOCITY SENSOR RING APPARATUS AND METHOD".
2) U.S. Pat. No. 5,111,138, issued May 5, 1992 to Kramer, entitled "SPEED SENSOR HAVING A CLOSED MAGNETIC FLUX PATH FOR SENSING SPEED FROM AN AXIAL FACE OF A ROTATING MEMBER".
3) U.S. Pat. No. 5,010,290, issued Apr. 23, 1991 to Foster, entitled "EASILY INSTALLED WHEEL BEARING SENSOR PACKAGE".
4) U.S. Pat. No. 4,988,220, issued Jan. 29, 1991 to Christiansen et al., entitled "SERVICABLE WHEEL SPEED SENSOR ASSEMBLY".
5) U.S. Pat. No. 4,795,278, issued Jan. 3, 1989 to Hayashi, entitled "BEARING ASSEMBLY".

The material incorporated by reference herein does not, per se, form the present invention.

C) Prior Art

In a known manner of sensing rotational velocity of a rotating body, a sensor ring, also known as an encoder ring, exciter ring or tone ring, is mounted so that it rotates with the rotating body. A variable inductance or variable reluctance sensor is mounted concentrically around the sensor ring or, alternatively, proximate to one portion of the exterior of the sensor ring. The sensor is fixedly mounted and does not rotate with the sensor ring. The sensor includes circuitry configured to provide an output signal that varies with the rotational velocity of the sensor ring. Typically, as the rotational velocity of the sensor ring increases, the frequency of the output signal increases.

One known type of sensor ring comprises a machined or pressed metal ring with extending teeth substantially equally spaced around the outside perimeter of the ring. The sensor is configured so that when the ring is in certain positions, each tooth lines up with one or more poles of the sensor. When the ring is then turned from that position so that the teeth are no longer directly aligned with the pole, the sensor detects a change in inductance or reluctance of the magnetic circuit including the sensor poles and the sensor ring. It is through detecting such changes in inductance or reluctance that rotational velocity sensors operate.

For the most part, sensor rings have been formed from powdered metal sintered into a desired shape. Certain metals in the composites are selected for their magnetic properties. However, the prior art has recognized that plain carbon steels, (i.e., sheet metal stock or plain carbon steel with alloying elements for enhanced magnetic properties), has superior ferro-magnetic properties and does function, if properly formed, as rotational sensor rings. Plain carbon steel sensor rings have been fabricated in a variety of ways which can be generally classified or grouped in several categories.

One category can be explained as forming fingers on a rotating hub such as shown in U.S. Pat. No. 5,080,500, issued Jan. 14, 1992, which are difficult to handle in mass manufacturing and tend not to be durable. Accordingly, the fingers are strengthened by being bent back onto one another and formed into a ring such as shown in my prior '442 patent cited above or interlocked together to form two hubs forming "windows" such as shown, for example, in U.S. Pat. No. 4,940,937, issued Jul. 10, 1990, which is generally not desirable.

Another category forms windows on a hub such as shown in the '138 patent and U.S. Pat. No. 5,166,611, issued Nov. 24, 1992. In the '278 patent, the windows are formed on a hub or on a hub which is formed as a cup or in one embodiment, a hub with a "V" shaped cross-section. The "windows" are formed between the ends or edges of the hub. In practice, it is difficult to form the shapes depicted from a blank without distorting the cylindrical hub and the windows.

Another type of sensor ring is shown in pictorial representation in prior art FIGS. 1A and 1B. This design has proven itself to be commercially durable, extremely rigid, and produces acceptable sensor signals. It is a variation of a design illustrated in the second embodiment disclosed in the '442 patent. The sensor is produced from a stamped blank in which the hub 1 is drawn and a stepped "U" shaped sensor portion 2 as shown in prior art FIG. 1B is formed radially outward of hub 1. The outer leg 3 of the "U" is corrugated or formed with sine shaped undulations 3 as best shown in FIG. 1B. Undulations 3 have peaks 4 and valleys 5 which correspond to the "windows" discussed above. The sensor pickup head detects the changes in the magnetic flux density which is caused by the peaks and valleys and then detects the rotational velocity of the sensor ring.

All of the sensor rings discussed are functional and several have been commercially implemented. Each, however, have drawbacks and can be improved. For example, finger designs are suspect of being bent or distorted not only in use but simply in the handling and storing of a large number of rings inevitably occurring in the manufacturing process of a bearing assembly. Window designs are preferred for reasons discussed below but are difficult to accurately produce from a stamped blank with minimal forming steps. Variations in the window edges cause accuracy error in the sensor signal and may require revised sensor design and/or cause mounting restrictions. Corrugated sensor rings give limits to sensor sensitivity due to lack of sharp edges which tend to provide better flux changes.

SUMMARY OF THE INVENTION

Accordingly, it is one of the main objects of the invention to provide an improved sensor ring which can be formed from a metal blank of minimal mass while producing improved magnetic performance.

This object along with other features of the invention is achieved in a method of manufacturing a rotational velocity sensor ring which includes the steps of forming a flat ring-shaped blank from a sheet of ferro-magnetic metal stock and drawing a cylindrical hub portion from the radially inner portion of the ring blank so that the blank has an L-shaped, cross-sectional configuration with an annular sensor portion extending radially outward from the hub portion. In the drawn blank, a plurality of substantially identical, circumferentially spaced windows are punched in the sensor portion with each window having an inner edge adjacent to but spaced radially outward from the hub portion and an outer edge adjacent to and spaced radially inwardly from the outside edge of the sensor portion. Importantly, the sensor portion is bent along an imaginary bend circle adjacent the windows' inner edges in the direction of the hub so that the blank now has a U-shaped, cross-sectional configuration while simultaneously forming an undulation in the sensor portion of the blank between the peripheral outer end of the sensor portion and the outer edge of each window whereby a symmetrically uniform sensor portion of the sensor ring is formed into a rigid structure from a blank with less metal or mass than that of the prior art.

In accordance with another important feature of the invention, the depth of the undulations formed in the bending step are precisely controlled to produce a sensor portion in the form of a substantially symmetrical cylinder or, alternatively, a substantially symmetrical frusto-conical sensor portion generally concentric with the hub portion of the ring whereby the sensor ring can be easily configured to match any number of anti-lock or like sensor mounting arrangements while maintaining a consistent air gap with the sensor during ring rotation to enhance sensor performance.

In accordance with another aspect of the invention, a one piece rotational velocity sensor ring is provided which includes a longitudinally-extending cylindrical hub portion and a sensor portion extending from the hub portion. The sensor portion has an annular bight segment extending radially outward from the hub portion and a generally cylindrical (or frusto-conical), longitudinally extending sensor segment extending from the bight segment and terminating an outer peripheral end. The sensor segment has a plurality of substantially identical window openings at equally spaced, circumferential increments therein with each window having an inner edge adjacent the hub portion and located within the bight segment, an outer edge adjacent to but spaced from the outer end of the sensor segment and a trailing and a spaced leading window edge extending between the inner and outer window edges, respectively. An undulation in the sensor segment between the outer end of the sensor segment and each window outer edge in combination with the windows results in a plurality of metal lands or teeth or fingers which extend between the trailing edge of one window and the leading edge of an adjacent window. The sensor lands are rigidized at one end by the bight sensor segment and at their other end by the undulations to provide a rigid ring which is not susceptible of being bent or distorted during handling or transport in mass assembly procedures while the open space provided by the windows between adjacent lands or fingers significantly enhances the magnetic permeability of the rings.

In accordance with yet another aspect of the invention, a rotational velocity sensor ring is provided which is formed from a ring having a stamped configuration bent into a final configuration. The stamped configuration of the ring has a flat annular sensor portion extending from a cylindrical hub portion to form an L-shaped cross-section with the sensor portion having a plurality of substantially identical window openings at equally spaced circumferential increments therein. Each window has an inner edge adjacent to and spaced radially outward from the hub, an outer edge adjacent to and spaced radially inward from the outer peripheral end of the sensor portion and a leading and trailing edge extending respectively from opposite ends of the inner and outer edges to form each window as a polygon, preferably a trapezoid. The sensor portion of the ring in the final configuration includes a bight sensor segment extending radially outward from the hub portion a distance beyond the inner edge and a sensor segment extending from the bight segment in the direction of the hub portion to form with the hub portion a U-shaped cross section with the sensor segment having an undulation between the outer edge of each window and the outer peripheral end whereby the leading and trailing edges of adjacent windows forming metal lands, teeth or fingers therebetween (circumferentially spaced about the ring) are substantially parallel to one another to produce consistent and clearly defined flux changes as the lands or fingers and the open spaced windows pass by the sensor head(s) when the sensor rotates.

In accordance with a more subtle but important feature of the invention, the geometric configuration of the window is correlated with the depth of the undulation to produce a desired spacing between the leading and trailing edges of adjacent metal lands or fingers. While the edges are preferably parallel to give precise demarcation flux changes as the magnetic flux lines pass from an open window space to a space occupied by a metallic finger or land, other configured edge relationships producing desired flux changes are possible. In all instances, the sensor pickup head is mounted between the undulations and the bight segment of the sensor portion, so that any influence on the flux fields caused by these metallic surfaces is minimized. Still further, the minimal effects on the magnetic permeability of the sensor ring caused by the undulations and the bight sensor segment are constant because of the irregular repeating patterns in the ring and the resulting noise is constant.

It is thus an object of the invention to provide a sensor ring formed with a minimal amount of metal.

It is another object of the invention to provide a sensor ring which has a configuration capable of providing improved or enhanced sensor performance.

In conjunction with the immediately preceding object, it is a specific object of the invention to provide a rotational sensor ring which allows for a wider air gap between sensor and ring at which the sensor can detect flux changes than conventional, metal stamped sensor rings.

In conjunction with the immediately preceding object, it is yet a more specific object of the invention to provide an improved rotational sensor ring which allows a greater freedom of sensor mounting and consequently an ability to mate a large variety of sensor packages in wheel bearing assemblies.

Yet another object of the invention is to provide a method for forming a rotational sensor ring which can readily produce conical as well as cylindrical sensor rings for use in a wide variety of wheel bearing assemblies.

Yet another object of the invention is to provide a rotational sensor ring which is stiff, durable and not readily deformable in the harsh automotive environment.

Still another specific object of the invention is to provide a formed metal rotational sensor ring which eliminates interlocking of individual parts which may otherwise occur in the ring manufacturing process or in the subsequent handling of a large number of the rings present when the rings are assembled onto wheel bearing spindles and the like.

A still further object of the invention is to provide a stamped metal rotational sensor ring which exhibits improved magnetic performance and contributes to the robustness of the sensor pickup unit when compared to existing stamped or powder metal sensor rings.

A general object of the invention is to provide a metal rotational sensor ring which is inexpensive and readily formed.

These and other objects, features and advantages of the invention will become apparent to those skilled in the art upon reading and understanding the Detailed Description of the Invention set forth below taken in conjunction with the drawings.

BRIEF DESCRIPTION OF THE DRAWINGS

The invention may take form in certain parts and in an arrangement of certain parts taken together and in conjunction with the attached drawings which form part of the invention and wherein:

FIG. 1A is a perspective view of a prior art sensor ring over which this invention is an improvement thereof;

FIG. 1B is a section view of a portion of the prior art sensor ring of FIG. 1A taken along lines 1b—1b of FIG. 1A;

FIG. 2 is a plan view of the sensor ring of the present invention;

FIG. 3 is a section view of the sensor ring shown in FIG. 2 taken along lines 3—3 of FIG. 2;

DETAILED DESCRIPTION OF THE INVENTION

Figure 4:
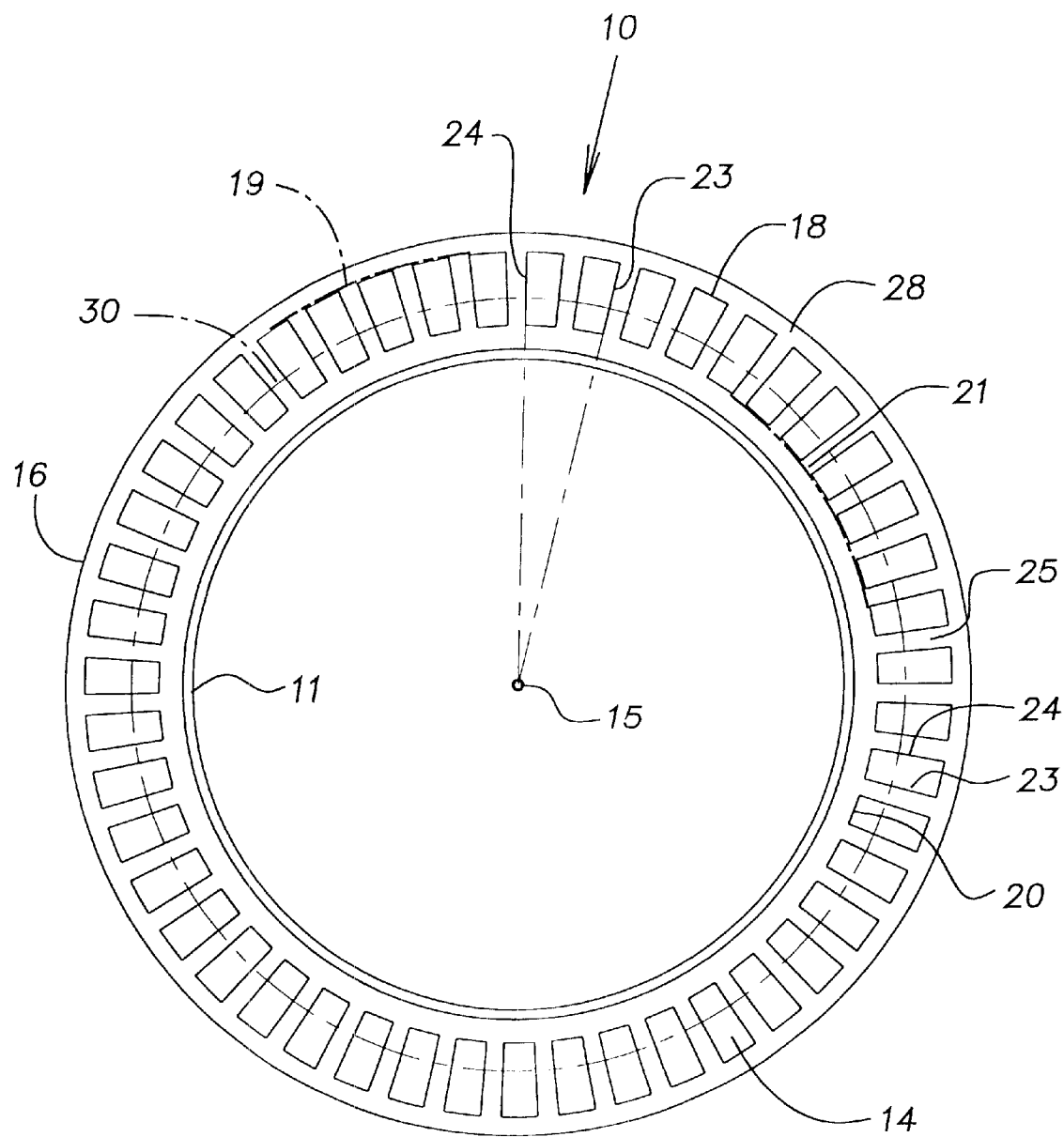
FIG. 4 is a plan view of a stamped blank formed in accordance with the invention.

Referring now to the drawings wherein the showings are for the purpose of illustrating a preferred embodiment of the invention only and not for the purpose of limiting the same, there is shown in FIG. 4 a metal blank 10 after blank 10 has been drawn and stamped into the shape illustrated in FIG. 4. Blank 10 is a metal with Ferro-magnetic properties, such as steel, so that when the sensor ring of the present invention is finally formed, the ring can function with variable reluctance, variable induction or inductance or active sensor technology. In the preferred embodiment, blank 10 is conventional sheet metal having gauge thickness typically associated with sheet metal stock. However, as noted in the Background, it is contemplated that blank 10 can include alloying elements which enhance the magnetic permeability of the metal although a plain carbon steel has been found satisfactory for blank 10. The invention does not contemplate forming the ring from sintered, powder metal composites which are not believed cost effective for the applications to which the present invention is directed nor is it believed that such composite bodies can be formed as desired in the present invention. Thus, Ferro-magnetic metal stock as used herein does not include sintered metal composites.

Figures 6, 7:
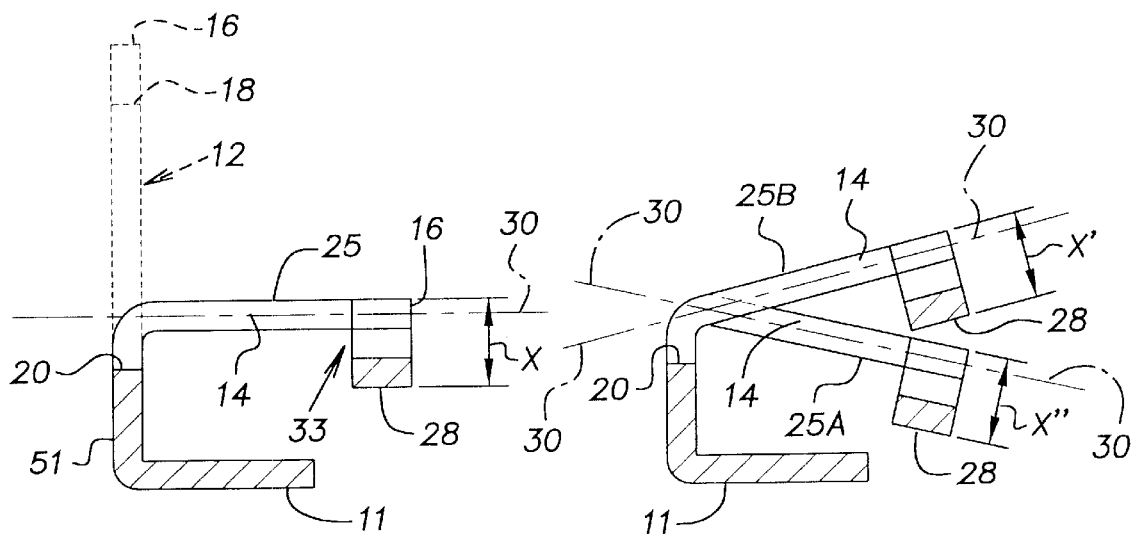
FIG. 6 is a longitudinally sectioned view of a portion of the sensor ring taken generally along lines 6—6 of FIG. 5A.
FIG. 7 is a view similar to FIG. 6 showing a longitudinally sectioned view of a portion of a sensor ring having a conical sensor ring shape; and, FIG. 8 is a perspective view of the rotational sensor ring of the present invention.

Referring still to FIG. 4, an annular, solid, thin metal blank (not shown) is initially provided (or stamped from a flat sheet) and a longitudinally extending hub portion 11 is drawn or punched in the inner portion thereof. When drawn, blank 10 has an L-shaped cross sectional configuration as best shown in FIG. 6 and includes a longitudinally extending hub portion 11 and a radially outwardly extending sensor portion 12. A part of sensor portion 12 is shown in dash outline form in FIG. 6 which is the cross-sectioned configuration of a portion of blank 10 of FIG. 4 taken along line 6—6. A plurality of openings or windows 14 are then stamped out of sensor portion 12. It should be noted that drawing hub portion 11 will extrude or reduce slightly the thickness of blank 10 in hub portion when compared to sensor portion 12. If windows 14 were punched before hub portion 11 was drawn, there could be a distortion in the shape of windows 14 which, as will become apparent shortly, is not desired and there is also the possibility that the flatness of sensor portion 12 could be adversely affected when drawing hub portion 11 if the windows were previously stamped out of blank 10. Thus the preferred embodiment prefers the sequence of initially drawing the hub followed by stamping the windows. In the broader scope of the invention, it is recognized that there may be metal forming techniques which allow the window stamping to occur at or prior to the time of hub drawing which will prevent or minimize window distortion or warping of sensor portion 12 so that it is not believed strictly necessary that the sequence be followed to practice the invention in its broader scope.

The size, shape and positioning of windows 14 in sensor portion 12 have a particularly important affect on the invention and the geometry of windows 14 are defined, for the preferred embodiment, to best explain the invention. Hub portion 11, as noted, is cylindrical and concentric about a longitudinally extending axis best indicated by point 15 in FIG. 4 represent the axis as extending out of the plane of the drawing. The peripherally extending outer end 16 of sensor portion 12 is concentric with hub 11 and thus lies in a circle centered on centerline 15. Each window 14 in the preferred embodiment has an outer arcuate edge 18 which is spaced radially inwardly from outer peripheral end 16. All outer edges 18 of windows 14, in the preferred embodiment, lie on the circumference of an outer window circle, only a portion of which is shown in FIG. 4 and designated by reference numeral 19. Each window 14 also has an inner arcuate edge 20 adjacent to but spaced radially outwardly from hub portion 14. In the preferred embodiment, inner edges 20 for all windows 14 lie on the circumference of an inner window circle 21 centered on centerline 15 and a portion of inner window circle 21 is shown in FIG. 4 and designated by reference numeral 21. Each window 14 has a radial leading edge 23 extending from outer edge 18 to inner edge 20 and a radial trailing edge 24 also extending from outer edge 18 to inner edge 20. As shown in FIG. 4 and in the preferred embodiment, leading and trailing edges 23, 24 are radial lines extending from centerline 15. In the stamped condition of the sensor, leading and trailing edges 23, 24 are not parallel with one another. It should also be noted that some prior art sensor rings show a finally formed sensor configuration similar to the stamped blank configuration of FIG. 4. Such prior art sensor rings require that the sensor be mounted such that its detector head extends parallel to hub portion 11 to maintain perpendicularity with sensor portion 12 (instead of perpendicular to hub portion 11 which is conventional because of bearing space constraints). In such prior art arrangements, leading and trailing edges 23, 24 are not parallel and will not produce a precise, on/off flux change as the sensor rotates and the rigidity of the prior art ring is suspect. In the preferred embodiment, window configuration is trapezoidal for reasons which will be explained shortly. However, the invention in its broader sense is not limited to trapezoidal windows and can encompass any polygonal window shape.

The steel in blank 10 between leading edge 23 and trailing edge 24 of adjacent windows 14 is defined as a finger or a tooth or a land 25. For definitional purposes, land 25 encompasses steel between trailing and leading edges 24, 23 of adjacent windows 14 extending from inner edge 20 to peripheral outer end 16 of sensor portion 12. Note that leading and trailing edges 23, 24 of any window 14 forms leading and trailing edge surfaces in adjacent fingers or lands 25. Because the leading and trailing edges of each window forms the leading and trailing edge surfaces of adjacent lands, the same reference numerals 23, 24 will be used for both so that drawing clarity can be maintained. The steel in blank 10 between window outer edge 18 and peripheral outer end 16 of sensor portion 12 is defined as a deformable sensor segment 28. Completing the description of blank 10 is an imaginary bend circle designated by reference numeral 30. Diameter of bend circle 30 is, among other things, a function of the geometry of windows 14 and the circumferential distance of lands 25. More particularly, the diameter of bend circle 30 cannot be less than inner window circle 21 and in theory could not approach the diameter of outer window circle 19. Additionally, bend circle 30 is a function of the final desired shape of sensor portion 12.

Figure 5B:
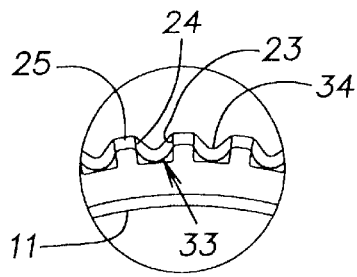
FIG. 5B is a magnified view of a portion of the sensor ring shown in a circle of FIG. 5A.

The stamped and drawn blank 10 shown in FIG. 4 is bent (not drawn so that metal thickness in sensor portion 12 remains approximately the thickness of metal blank 15) in the direction of hub portion 11. It is preferred that sensor portion 12 be bent in the direction of hub 11 for ring rigidity. However, in accordance with the broader scope of the invention, sensor portion 12 could be bent in a direction opposite of portion 11 (forming an "S" shaped cross-sectional configuration). It should be clear that if sensor portion 12 is bent along bend circle 30 without anything more, the diameter of peripheral outer end 16 would have to shrink to the diameter of bend circle 30 (assuming sensor portion 12 was shaped as a cylinder concentric with hub portion 11 as shown in FIG. 6). The result would be a distortion or a waviness formed in sensor portion 12. The invention recognizes that this result would otherwise occur and while bending sensor portion 12 about imaginary circle 30, a bend or an undulation 33, as best shown in FIG. 5B, is formed in each deformable sensor segment 28. Only deformable sensor segment 28 is bent into an undulation. Fingers or lands 25 are not bent into an undulation. That is, the bending operation is performed, for example, by an annular backing die or a plate (not shown) formed as a cylinder (or a cone) with a plurality of fingers matched to fingers or lands 25 extending from imaginary bend circle 30 all the way to the outer peripheral end 16 of blank 10 (annular blanking die or plate fitted onto hub portion 11). A press die (not shown) would then bend sensor portion 12 against the backing die into the desired configuration and has a number of V-shaped bending studs which press the center 34 of each deformable center segment 28. Because the backing die supports land 25, all lands remain flat and undistorted all the way to peripheral outer edge 16 while the unsupported deformable sensor segments 28 are indented by the V-shaped bending studs generally assume an undulating shape 33 which, in practice, generally takes the form of a sine wave.

Figure 8:
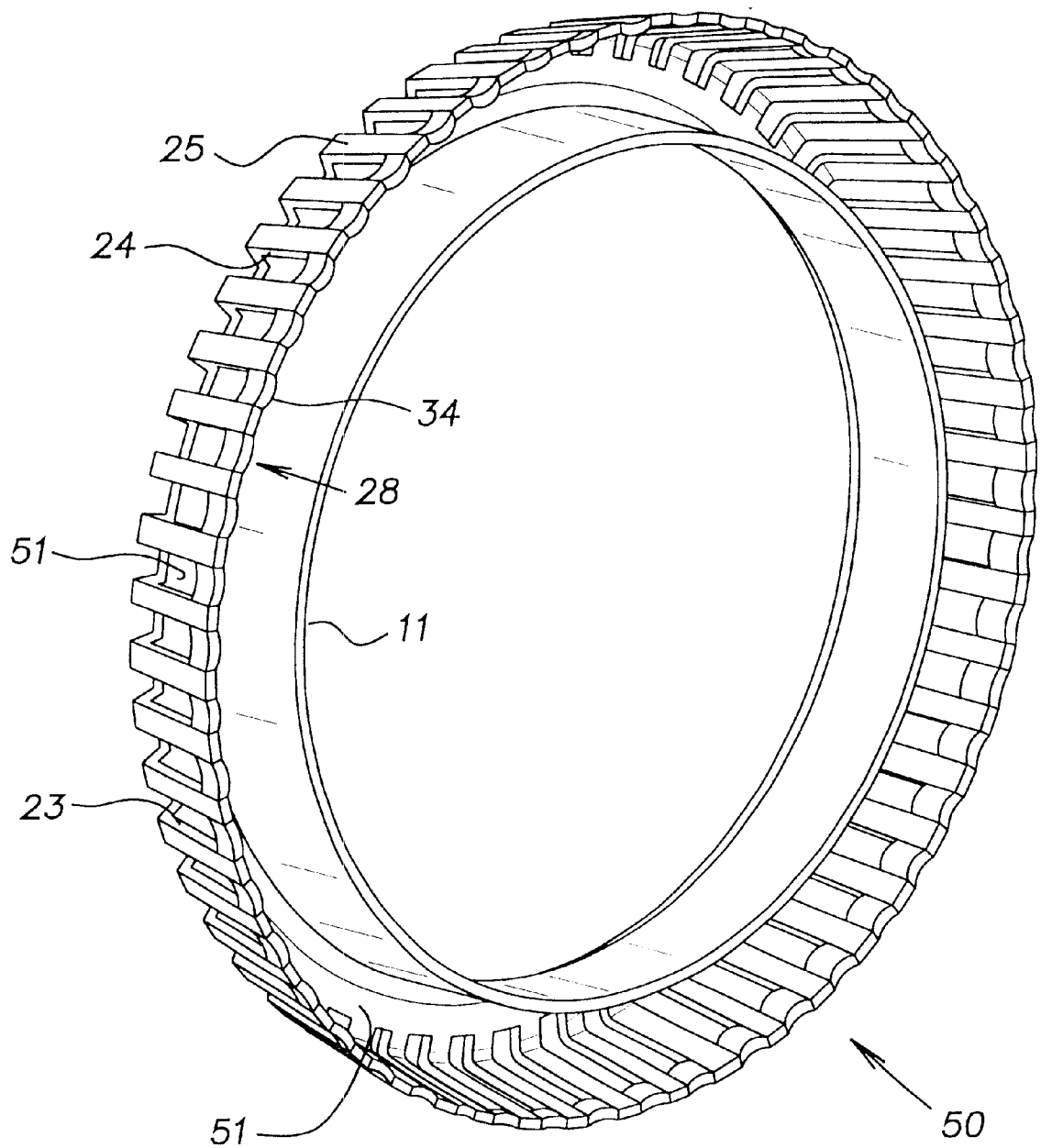

Referring now to FIGS. 6 and 7, sensor portion 12 can be bent about imaginary circle 30 to form lands 25 lying in a cylindrical plane concentric with a portion 11 or, as shown in FIG. 7, lying in a frusto-conical plane pitched or inclined either towards hub portion 7 as designated by reference numeral 25A or away from hub portion 7 as designated by reference numeral 25B. Reference numeral 25B is the preferred embodiment of the invention and is illustrated in FIGS. 2, 3 and 8. With metal blank 10 bent as described to form sensor ring 50, the ring has a U-shaped cross-sectional configuration as illustrated in FIGS. 3, 6, 7 and 8. The base or bottom leg of the U is hub shaped portion 11 and the top or sensor leg of the U comprise lands 25 while the base or bight segment 51 of the U is that radially extending segment of sensor portion 12 formed in blank 10 which is not bent. Again, it should be clear that leading and trailing edges 23, 24 of windows 14 form leading and trailing edge surfaces of adjacent fingers or lands 25. In the preferred embodiment, the leading and trailing edge metal surfaces are radial as shown in FIG. 4, but the depth of undulation 33 designated by reference dimension "X" in FIG. 6 is set at a distance such that the leading and trailing edge surfaces are brought into substantially parallel relationship when the blank 10 is formed into sensor ring 50. (The depth of undulation 33 for conical applications shown in FIG. 7 are designated X' and X" and are slightly different from one another and form the cylindrical application shown in FIG. 6.) More specifically, inner arcuate edge 20 of each window 14 extends a distance between leading and trailing edges 23, 24 which is less than the arcuate distance of outer arcuate edge 18 between leading and trailing edges 23, 24. The depth "X" of undulation 33 is set to close outer arcuate edge 18 to a distance equal to that of inner arcuate edge 20. Window 14 is thus, for the preferred embodiment, brought from a trapezoidal into a rectangular shape with the result that the leading and trailing edge segments of fingers or lands 25 are substantially parallel with one another. Preferably, this relationship is maintained by sizing trapezoidal windows 14 to account for the applications of sensor ring 50 when sensor ring 50 is formed so that fingers 25 are lying in a conical or frusto-conical plane either pitched towards or away from hub portion 11 as shown in FIG. 7. While it is preferred to set undulation depth X, X', or X" to bring leading and trailing edges 23, 24 into parallel relationship for cylindrical or conical configurations of sensor ring 50, those skilled in the art will recognize that it is important that the depth of all undulation 33 in sensor ring 50 be equal.

The final configuration of sensor ring 50 is best shown in the pictorial view of FIG. 8. As noted, hub portion 11 is drawn whereas sensor portion 12 is bent so sensor portion 12 retains gauge thickness of sheet stock 10 maximizing magnetic permeability of sensor ring 50. Importantly, fingers or lands 25 are rigidly supported at their axial ends. One end is supported by bight segment 51 which finger 25 is integral with and the opposite axial end is supported by deformable sensor segments 28 extending from leading and trailing edge surfaces 23, 24 of each finger 25. Thus, fingers 25 when bent at bend circle 30 and supported as stated, lie in a cylindrical or frusto-conical plane in a surprisingly rigid, non-deformable manner. Because there are no edge openings between the fingers as in some prior art sensor rings described above, the handling, storage or transportation problems present when sensor rings 50 are applied to automotive wheel bearings on an assembly line are minimized. More importantly, sensor rings 50 are durable when applied to the harsh environment in which vehicular applications are subjected to.

Importantly, the magnetic permeability of sensor ring 50 is enhanced or improved for at least two reasons. First, window 14 has no bottom. This should be contrasted with prior art ring shown in FIG. 1A in which the undulations had peaks and valleys 4, 5 so that the lines of flux detected by the pickup or detector heads of the sensor always passed through metal surfaces although at different distances. By providing an open window air space, a dramatic change in flux occurs as fingers 25 and window air spaces 14 pass by the sensor heads (poles). The result is that the detector head of the sensor (i.e., sensor pole(s)) can be spaced radially further from sensor ring 50 to operate at a wider air gap than in some of the prior art arrangements discussed above. The air gap is schematically illustrated in FIGS. 2 and 3 by the dimension indicated by reference letter G which is shown for a sensor having a single pickup unit or detector head (i.e., pole) schematically illustrated by dash lines indicated by reference numeral 55. Those skilled in the art will understand that depending upon sensor design, the sensor may have only one pickup unit 55 or may, in fact, have a plurality of pickup units, even to the extent of circumscribing sensor ring 50 such as illustrated in the '442 patent. The second reason for improved magnetic permeability of sensor ring 50 is the fact that, in the preferred embodiment, leading and trailing edges 23, 24 of adjacent fingers 25 are straight line, parallel edge surfaces. It is recognized that so long as the window 14 and finger 25 spacing is constant, for all windows and all fingers on sensor ring 50, the trailing and leading edges do not have to be parallel. However, theoretically, there conceivably could be slight axial shaft run out when the sensor ring rotates in some applications which will cause variation in the spacing between windows and fingers or lands 25 if the trailing and leading edges are not parallel. While the sensor will still function, the sensitivity of sensor ring 50 is enhanced if leading and trailing edge surfaces 23, 24 are parallel as discussed for the preferred embodiment.

Finally, it is noted that in theory the presence of deformable sensor segment 28 in windows 14 could affect lines of magnetic flux as sensor ring 50 transitions between finger 25 and window 14 or window 14 and finger 25. In practice, this is not a concern because, as shown in FIG. 3, the width of the pickup head 55 is less than the length of fingers 25 so that pickup head 55 can be positioned over the unobstructed open space provided by window 14.

Use of various terminology herein such as pickup head, detector head, sensor pole, pickup unit, etc., are all basically referring to the sensor, i.e., single or multiple poles detecting magnetic flux changes and are used interchangeably herein.

Stamped sensor rings have been used in wheel speed sensors in the past as low cost/low mass replacements for powdered metal parts. Each of these rings was configured to provide interruptions in a solid magnetically permeable surface which could be sensed with a common magnetic speed sensor. Configurations used were either individual fingers which were stamped and formed, where holes stamped in a flat surface to provide "windows" in the surface, or where surfaces formed by stamping which gave convoluted or wavy surfaces. Each of these designs had its faults—windows gave little flexibility in the part shape, fingers were very vulnerable to damage and bending, while convoluted rings were very robust but gave marginal sensor performance. This invention covers a stamped ring which is different from any seen today as it combines the best performance features from a stamped window type ring with the physical robustness of a convoluted ring.

The ring configuration utilizes a stamping operation as well as a bending and folding operation for the formation of the sensor teeth but not drawing which might tend to thin the teeth and reduce the magnetic mass and degrade sensor output. As may be seen in the attached drawings a part for use with a radial sensor might be formed as in FIG. 4 with the bore or ring mounting surface being formed up out of the plane of the teeth or fingers while the material is a blank shape. Next the fingers or teeth of the sensor ring are actually formed by stamping keystone shaped holes in the flat surface of the ring material. The sides of the teeth are somewhat parallel to maximize the magnetic mass. The part is then formed as demonstrated in FIG. 6 from an "L" shape into a "U" shape. As this forming takes place the basis of this invention comes to light.

Figure 5A:
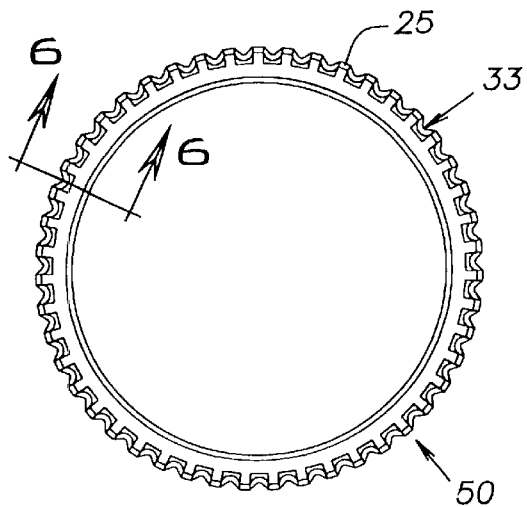
FIG. 5A is a plan view of the formed sensor ring of the present invention similar to that shown in FIG. 2 but without details present in FIG. 2.

The outer ring which was formed in the window stamping process to produce the teeth or fingers is actually reduced in circumference by a deforming of the metal into a wave form as shown in FIG. 5A or better in FIG. 5B. It is this wave form which gives the part the stiffness required to maintain tooth or finger position and actually ties the ends of the teeth together to eliminate interlocking of individual parts in the manufacturing process or subsequent handling while at the same time being away from the active surface of the teeth and therefore increasing magnetic performance.

The outer surface of this ring need not be cylindrical but might also be conical for certain applications.

The invention has been described with reference to a preferred embodiment. Obviously, alterations and modifications will occur to those skilled in the art upon reading and understanding the Detailed Description of the Invention as set forth herein. It is intended to include all such modifications and alterations insofar as they come within the scope of the present invention.

Having thus defined the invention, it is claimed:

1. A method of manufacturing a rotational velocity sensor ring comprising the acts of:
    a) forming a flat ring shape blank from a sheet of ferro-magnetic metal stock;
    b) drawing a cylindrical hub portion from the radially inner portion of the ring blank so that the blank has an "L" shaped cross-sectional configuration with an annular sensor portion extending radially outward from the hub portion;
    c) punching a plurality of substantially identical, circumferentially spaced windows in the sensor portion, each window having an inner edge adjacent to but spaced radially outwardly from the hub portion and an outer edge adjacent to and spaced radially inwardly from the outside end of the sensor portion; and,
    d) bending the sensor portion along a first imaginary circle adjacent the windows' inner edges in the direction of the hub so that the blank has a "U" shaped cross sectional configuration while forming an undulation in the sensor portion between the outside end of the sensor portion and the outer edge of each window.

2. The method of claim 1 wherein the acts are performed sequentially in the order listed and the forming act is the act of stamping the ring blank from a metal sheet.

3. The method of claim 1 wherein each window is circumferentially spaced at equal increments from one another and has a leading edge and a trailing edge extending between the inner and outer window edges, the leading and trailing edges extending as radial lines from the center of a circle defining the outer edge of the sensor portion so that the windows when punched are generally trapezoidal in configuration and generally rectangular in configuration when the sensor portion is bent.

4. The method of claim 1 wherein the undulations are controlled in a depth direction extending towards the hub portion to cause the blank area encompassing the windows to be formed as a cylinder generally concentric with the hub portion.

5. The method of claim 1 wherein the undulations are controlled in depth extending towards the hub portion to cause the blank area encompassing the windows to be formed as a frusto-conical surface pitched relative to the hub portion.

6. The method of claim 1 wherein the undulations are sinusoidal.

7. The method of claim 1 wherein the thickness of the sensor portion is generally maintained at the thickness of the blank when bending the sensor portion.

8. The method of claim 1 wherein the first imaginary circle is spaced radially outwardly from the window's inner edge.

9. The method of claim 2 wherein each window is circumferentially spaced at equal increments from one another and has a leading edge and a trailing edge extending between the inner and outer window edges, the leading and trailing edges extending as radial lines from the center of a circle defining the outer edge of the sensor portion so that the windows when punched are generally trapezoidal in configuration and generally rectangular in configuration when the sensor portion is bent.

10. The method of claim 9 wherein the thickness of the sensor portion is generally maintained at the thickness of the blank when bending the sensor portion.

11. The method of claim 1 wherein each window is circumferentially spaced at equal increments from one another and has a leading edge and a trailing edge extending between the inner and outer window edges, the leading and trailing edges extending as radial lines from the center of a circle defining the outer edges of the sensor portion so that the windows when punched are generally traperzoidal in configuration and generally rectangular in configuration when the sensor is bent.

12. The method of claim 11 wherein the undulations are sinusoidal.

13. The method of claim 12 wherein the undulations are controlled in a depth direction extending towards the hub portion to cause the blank area encompassing the window to be formed as a cylinder generally concentric with the hub portion.

14. The method of claim 12 wherein the undulations are controlled in depth extending towards the hub portion to cause the blank area encompassing the windows to be formed as a frusto-conical surface pitched relative to the hub portion.

15. A rotational velocity sensor ring formed from a ring having a stamped configuration bent into a final configuration comprising:

said stamped configuration having a flat annular sensor portion extending from a cylindrical hub portion to form an L-shaped cross-section, said sensor portion having a plurality of substantially identical window openings at equally spaced circumferential increments, each window having an inner edge adjacent to and spaced radially outwardly from said hub, an outer edge adjacent to and spaced radially inwardly from the outer peripheral end of said sensor portion and a leading and trailing edge extending respectively, from opposite ends of said inner and outer edges to form each window as a polygon; and, said sensor portion in said final configuration including a bight segment extending radially outward from said hub portion a distance beyond said inner edge and a sensor segment extending from said bight segment in the direction of said hub portion to form with said hub portion a U-shaped cross-section, said sensor segment having an undulation between said outer edge of each window and said outer peripheral end.

16. The sensor ring of claim 15 wherein the trailing and leading edges of adjacent windows represent radial lines extending from a common center to form windows having a generally trapezoidal shape in said stamped configuration and the depth of each undulation extending in the direction of said hub portion in said final configuration to form windows having a generally rectangular shape with generally parallel trailing and leading edges.

17. The sensor of claim 16 wherein said undulations are generally sinusoidal wave.

18. The sensor ring of claim 17 wherein the depth of each sine wave in said final configuration is correlated to the distance of said outer edge in said stamped configuration to produce a cylindrical bight segment generally concentric with said hub portion.

19. The sensor ring of claim 17 wherein the depth of each sine wave in said final configuration is correlated to the distance of said outer edge in said stamped configuration to produce a frusto-conical bight segment inclined towards or away from said hub portion.

20. A one piece rotational velocity sensor ring comprising:
  a) a longitudinally-extending cylindrical hub portion;
  b) a sensor portion extending from the hub portion, the sensor portion having
    i) an annular bight segment extending radially outward from the hub portion;
    ii) a generally cylindrical, longitudinally extending sensor segment extending from the bight segment and having an outside end, the sensor segment having a plurality of substantially identical window openings at equally spaced circumferential increments therein, each window having an inner edge adjacent the hub portion and located within the bight segment, an outer edge adjacent to but spaced from the outer end of the sensor segment and a trailing and a spaced leading window edge extending between the inner and outer window edges, respectively; and,
    iii) an undulation in the sensor segment between the outside end of the sensor segment and each window outer edge.

21. The sensor ring of claim 20 wherein the sensor segment is cone shaped and pitched towards or away from the hub portion.

22. The sensor ring of claim 20 wherein the sensor segment extends longitudinally in the same direction as the hub portion.

23. The sensor ring of claim 22 wherein each undulation is sinusoidal and extends toward the hub portion.

* * * * *